June 24, 1958 D. W. KREUTHMEIR 2,840,729
ELECTROSTATIC GENERATOR CONSTRUCTION
Filed Jan. 23, 1956 2 Sheets-Sheet 1
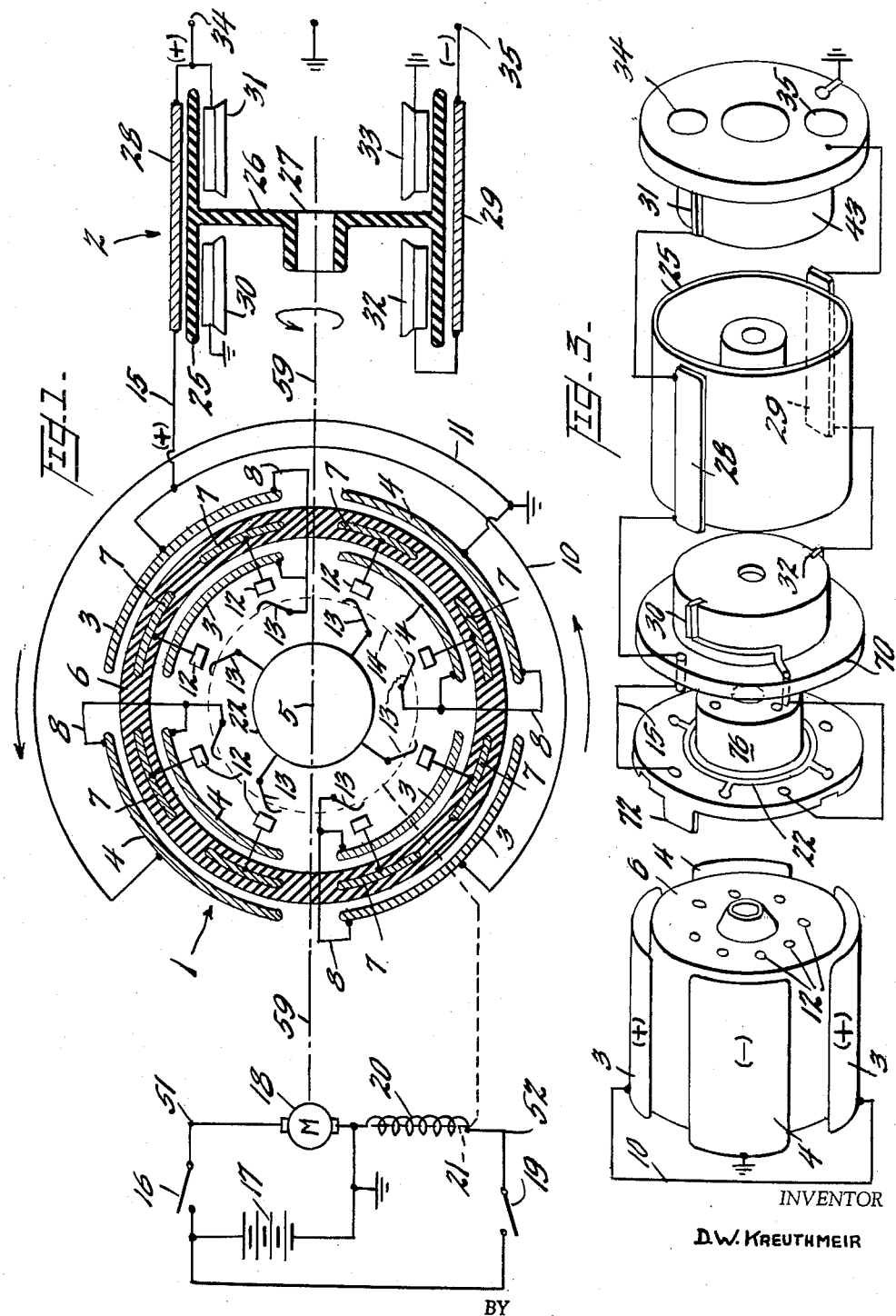
INVENTOR
D. W. KREUTHMEIR
BY Watson, Cole, Grindle & Watson
ATTORNEYS

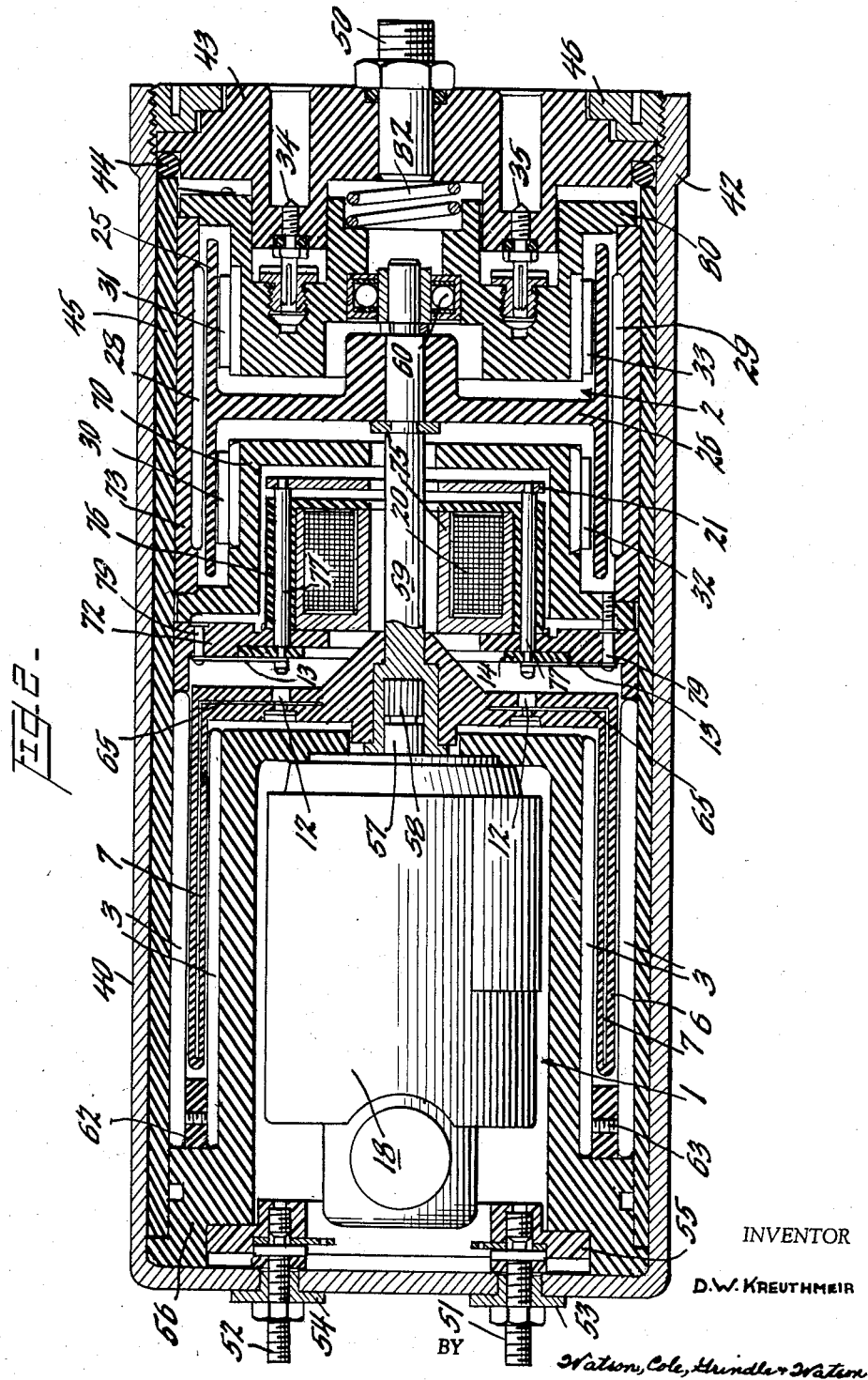

United States Patent Office 2,840,729
Patented June 24, 1958

2,840,729

ELECTROSTATIC GENERATOR CONSTRUCTION

Donald W. Kreuthmeir, Denver, Colo., assignor to Heckethorn Manufacturing & Supply Co., Littleton, Colo., a corporation of Colorado Application January 23, 1956, Serial No. 560,759

14 Claims. (Cl. 310—6)

This invention relates to electrostatic generators, and in particular to an improved structural arrangement for operatively associating a plurality of interconnected electrostatic generators.

Within recent years, the substantial improvements in automotive and aircraft engines have resulted in considerable demand for improved ignition systems so that the optimum theoretical performance of these engines may be more nearly approached. Considerable recent activity has been directed to the development of improved ignition systems employing electrostatic generators as the source of the high potentials required for producing ignition sparks.

Broadly speaking, electrostatic generators suitable for ignition purposes are classifiable in two categories. Namely, those in which electrostatic charges are transported on a conveyor of insulating material with respect to associated inductors, and those in which the electrostatic charges are transported on a conductive conveyor with respect to the associated inductors. Generators belonging to each of the foregoing classifications possess different electrical characteristics and are also capable of varied and unique mechanical constructions.

In order to attain voltage and current characteristics suitable for ignition purposes it has heretofore been necessary to connect a plurality of electrostatic generators in cascade. Various arrangements have been proposed in which electrostatic generators of both types have been operatively associated with respect to one another. For example, the copending application of Noel Felici, Roger Morel and Marcel Point, Serial No. 492,496, filed March 7, 1955, for "Quick Starting Electrostatic Generator," discloses a system in which three electrostatic generators are connected in cascade with respect to one another. The individual generator units of this arrangement are aptly termed primer, exciter, and main generators in view of the functions performed. More particularly, the main generator supplies directly the energy required for establishing the ignition sparks, and the exciter generator supplies an exciting potential to the main generator inasmuch as the main generator is not self-exciting. The primer generator primes the exciter generator momentarily so that thereafter the exciter generator is self-exciting.

As is disclosed in the cited application, the primer generator is preferably of the conductive conveyor category inasmuch as this type can be fabricated so that it is self-priming and self-exciting, and the exciter generator is preferably of the insulating conveyor type inasmuch as the output potential thereof is relatively constant in amplitude and also because this generator can be made self-exciting after the momentary application of a priming potential.

A principal object of this invention is to provide an improved structural arrangement for integrally associating primer and exciter electrostatic generators within a single housing so as to attain optimum use of the space therein. It may be readily appreciated that the achievement of such an object is desirable in ignition applications as well as other applications in view of the stringent space requirements of many modern installations.

Another object of this invention is to provide an improved structural arrangement for reliably disconnecting the primer generator from the exciter generator after the primer function has been accomplished.

Another object of this invention is to provide an improved structural arrangement for more effectively containing a dielectric and ionizing gas within a composite housing for a plurality of associated electrostatic generators.

Another object of this invention is to provide an improved arrangement for mechanically driving the rotor elements of a plurality of associated electrostatic generators.

A preferred embodiment of this invention features a generator construction in which a conductive-conveyor primer generator, an insulating-conveyor exciter generator, and also the motor for driving the rotating components of these generators are all located within a single, cylindrical housing. The motor is positioned at one end of the housing, and a drive shaft coupled to the motor and supported in axial alignment with the longitudinal axis of the housing is extended to the other end of the housing. The drive shaft is coupled directly to the rotatable conveyors of both the primer and the exciter generators.

The inductors and conveyors of the primer generator are so arranged upon supporting components that a generally U-shaped cup is formed having a central bore which envelopes the drive motor, and the conveyor of the exciter generator is characterized by a cylindrical construction having an H-shaped cross section as has been previously disclosed in the application of Roger Morel, Serial No. 465,395, filed October 28, 1954, for "Commutation Means for Electrostatic Machines."

An armature and actuating solenoid therefor are positioned within a first of the bores provided by this H-shape construction, and support bearings for the drive shaft and the generator output terminals are supported within the second of the bores. The armature actuated by the solenoid drives a plurality of contacts through a contact lever plate which enables the primer generator to prime the exciter generator during the generator start-up period.

It may be readily seen that the foregoing construction advantageously envelopes various required components of the two cascaded generators by a cylindrical disposal of elements in such a manner that an efficient utilization of space is attained. Additionally, inasmuch as the drive motor is located within the housing, the drive shaft does not extend through the housing walls, and therefore a dielectric gas can be effectively contained within the housing.

In order that all of the structural features for attaining the objects of this invention may be readily understood, detailed reference is herein made to the drawings wherein:

Figure 1 is a schematic diagram showing the electrical connection and significance of the structural generator components shown in Figure 2, Figure 2 is a longitudinal sectional view of a preferred embodiment of the novel generator construction of this invention adapted for a connection of components in accordance with the diagram of Figure 1, and Figure 3 is a simplified exploded view of certain of the principal components of Figure 2.

The schematic diagram of Figure 1 discloses in simplified form the connection of a conductive-conveyor primer generator 1 to drive an insulating-conveyor exciter generator 2 in an ignition application. The circuit arrangement as broadly shown is generally conventional or disclosed in certain detail in the currently pending applications hereinbefore cited. Reference to a specific circuit arrangement is made herein, however, in order that the electrical functioning and connections of the novel generator structure shown in Figure 2 may be readily understood. It should be clearly understood, however, that the unit herein described has utility in non-ignition applications such as, for example, a high-voltage supply for applications having low current requirements.

In Figure 1, two sets of arcuate inductor members are disposed in an interspersed spaced relation about an axis of rotation. A first set comprising inductors 3 is disposed on a first diameter through the axis 5, and the interspersed set comprising inductors 4 is disposed on a diameter at right angles to the diameter of set 3. The individual inductors 3 and 4 of the respective sets each are composed of two parts disposed at opposite sides of the cylindrical walls of a hollow rotor 6. The rotor 6 is supported by an end wall (not shown) for rotation through the space between the two parts of each inductor member.

The rotor 6 is fabricated of insulating material and carries a plurality of conveyor members 7 fabricated of conductive material. In the embodiment disclosed in Figure 1, eight conveyors 7 are disposed in spaced relation about the axis of rotation. These conveyor members are of arcuate form and are embedded in the insulating material of the rotor 6 so that all surfaces of the conveyors are covered by the insulating material of the wall. The arcuate extent and the spacing of the conveyor members from each other are such that two of the conveyor members are disposed between the inner and outer parts of each inductor member when the rotor is positioned as shown.

The mating inner and outer parts of each inductor are electrically connected together by conductors 8, so that these two parts assume the same polarity and potential. The inductors of each set are electrically connected together in separate multiple connections by conductors 10 and 11. The inductors 3 are arbitrarily assumed to be at a positive polarity hereinafter in the specification and the inductors 4 are assumed to be at negative (ground) polarity. Reverse polarities are, of course, possible depending upon the polarity of the residual charges on the generator components prior to generator start up.

A plurality of rotor contacts 12, each individually connected to a different conveyor 7, are disposed in spaced relation about the axis of rotation. This set of contacts rotates in correspondence with the conveyors and makes contact at the appropriate times with a set of stationary spring contacts 13. Spring contacts 13 are mechanically ganged with respect to one another by a contact lever plate 14 as indicated by the broken line ring. These contacts are normally removed from the associated rotor contacts 12, as is shown in the drawing, whereby the primary generator is normally rendered incapable of applying an output potential to conductor 15.

In order to obtain an output potential from primer generator 1, it is necessary, of course, to rotate the conveyors with respect to the associated stationary inductors. This operation is accomplished by closing switch 16, which may, for example, be an automobile ignition switch, thereby applying an energizing potential from battery 17 to direct-current motor 18. Motor 18 is mechanically coupled to a drive shaft 59 passing through the axis of rotation 5 and coupled to the rotor 6 so as to drive conveyors 7 in the required manner.

The subsequent closure of starter switch 19 applies an energizing potential from battery 17 to solenoid 20 which actuates an armature 21 which is mechanically coupled to contact lever plate 14 to drive spring contacts 13 outwardly and into mating engagement with the rotating contacts 12. This occurrence enables the primer generator 1 to generate an output as follows:

Prior to operative rotation of the primer generator, each of the conveyor plates 7 carries a random or residual electrostatic charge which defines the potential of that plate with respect to ground. In the nature of things, it is relatively impossible for each of these plates to assume the same potential unless they are interconnected, and therefore it is possible for a conductive conveyor plate type generator to be self-priming. The closure of switch 16 causes the rotation of the conveyors 7 with respect to the associated sets of inductors 3 and 4 in the direction indicated by the arrow. As the conveyor plates rotate, the slight difference in the potential thereof is capable of rapidly developing an output generator voltage appearing between conductor 15 and ground.

The conveyor plates 7 which are connected to the inductor plates 3 or 4 by means of conductors 8 give up or transfer their charge to the connected inductors. The conveyor plates 7 which are multiply connected to one another by means of conducting ring 22 are subjected to a transfer of charges among the interconnected conveyors so that each conveyor is ultimately charged to a potential having a polarity opposite that of the immediately associated inductor. In particular, with the rotor positioned as shown in the drawing and with the random initial charges on the conveyors 7 being of such a nature that the output potential of conductor 15 with respect to ground is positive, the advanced conveyor 7 between the two mating parts of each inductor 3 is ultimately charged to a negative potential, and the trailing conveyor is transferring its positive charge to the inductors 3 which have a positive polarity. The advance and trailing conveyors positioned between the two mating parts of each inductor 4 perform corresponding functions, however, with polarities opposite to those of the corresponding conveyors positioned between the mating parts of each inductor 3.

The output of primer generator 1 activates exciter generator 2. The exciter generator is shown in longitudinal section in order to more clearly represent the basic elements. These elements include a rotor 25 having an H cross-section formed with a centrally disposed web 26. This web is provided with a bore 27 for receiving drive shaft 59 which also drives rotor 6 of primer generator 1. Inasmuch as the exciter generator is an insulating conveyor type generator, rotor 25 is fabricated of an insulating material. A set of diametrically opposed inductor plates 28 and 29 are closely coupled to the outer cylindrical surface of rotor 25. Ionizer 30 is operatively associated with the left portion of inductor 28 with the wall of rotor 25 positioned therebetween, and collector ionizer 31 is operatively associated with the right portion of inductor 28 with the wall of rotor 25 being positioned therebetween. Ionizer 30 is grounded, and collector ionizer 31 is directly connected to inductor 28. Collector ionizer 32 is operatively associated with the left portion of inductor 29 with the wall of rotor 25 being positioned there between, and ionizer 33 is operatively associated with the right portion of inductor 29 with the wall of rotor 25 being positioned therebetween. Ionizer 33 is grounded and collector ionizer 32 is directly connected to inductor 29.

The mode of operation of the exciter generator 2 is briefly as follows. With the application of a positive priming potential between conductor 15 and ground in response to the closure of switches 16 and 19, inductor 28 is charged positively to the output potential of primer generator 1. With this occurrence, ionizer 30 deposits negative charges on the inside wall of the rotor 25 to the left of web 26. These negative charges are transported by the rotating conveyor 25 to the locale of collector ionizer 32. The negative charges are thereby removed from the inside rotor wall. Inasmuch as inductor 29 is directly connected to collector ionizer 32, this inductor assumes a relatively high negative potential with respect to ground. The negative potential of inductor 29 in turn causes the deposition of positive charges through ionizer 33 on the inside wall of rotor 25 to the right of web 26. These positive charges are transported by rotor 25 to the locale of collector ionizer 31. This ionizer removes the positive charges, and inasmuch as conductor 28 is connected to ionizer 31 the inductor is charged positively by a source other than the positive primer output potential appearing on conductor 15.

After an initial period of priming by primer generator 1 and when the requisite charges are built up on rotor 25, exciter generator 2 becomes self-sustaining in the sense that it provides its own priming potentials. When this point of operation has been attained, switch 19 is preferably opened thereby de-energizing solenoid 20 whereby contact lever plate 14 is returned by the spring force of stator contacts 13. This action causes stator contacts 13 to separate from rotor contacts 12 thereby removing the primer energization from conductor 15. Exciter generator 2, however, continues to deliver output between terminals 34 and 35 and ground inasmuch as this generator is now self-exciting.

A detailed and novel structural arrangement showing the disposition and form of the various component parts of a practical generator construction following the schematic of Figure 1 is shown in the longitudinal sectional view of Figure 2. The simplified exploded view of Figure 3 also shows the general form and interconnection of most of the principal components of the generator of Figure 2.

As is shown in Figure 2, primer generator 1 and exciter generator 2, together with drive motor 18, are integrally housed within a single metallic housing 40. The wall of housing 40 is formed so that the left end of the cylindrical bore is closed as is shown, and the right end of the housing is flared slightly at 42 so as to receive a closure cap 43 which is fabricated of the insulating material. Sealing ring 44 is tightly sandwiched between the peripheral lip of cap 43 and the right end of dielectric sleeve 45 so as to form a gaseous seal at this point. Inside ring nut 46 tightly couples cap 43 and housing 40 so as to seal the inside of the housing whereby a dielectric gas may be contained therein.

Output terminals 34 and 35 are supported in part by cap 43. As is shown in the schematic diagram of Figure 1, these output terminals are connected to the exciter generator 2 in such a manner that the positive and negative high voltages of the combination are applied thereto.

Cap 43 also supports gaseous charging valve 50. This valve is adapted for connection to a dielectric gas source whereby the enclosed volume within the housing may be charged with a satisfactory dielectric gas required for preventing high voltage breakdown of the closely spaced components. It should be noted that the enclosed gas performs a dual function with respect to both generator sections. In particular, the gas serves as a dielectric medium in the primer section, and as an ionizing medium in the exciter section.

Input terminals 51 and 52 supported by the left end of housing 40 provide for external connections to motor 18 and to solenoid 20 as is shown in the schematic circuit diagram of Figure 1. These terminals are insulated from housing 40 by means of shoulder washers 53 and 54. The ends of terminals 51 and 52 positioned within housing 40 are mechanically supported by insulator terminal block 55 which is mechanically locked to motor and motor mount 56 which is fabricated of insulating material. Motor 18 is housed within the central bore of rotor 6 and motor mount 56, whereby optimum use of the available space in the section of the generator is attained. Drive shaft 57 of motor 18 carries a spline 58 which rotatably drives shaft extension 59. Rotor 6 of primer generator 1 and rotor 25 of exciter generator 2 are synchronously driven by shaft 59. The terminal end of shaft 59 removed from motor 18 is supported by means of bearings 60. Snap ring 61 positioned between rotor 25 and bearings 60 hold shaft 59 in place.

The inductor members 3 and 4 are circumferentially positioned on the outside cylindrical surface of motor and motor mount 56. The individual parts of each inductor are spaced from one another by means of plate separator ring 62 which is fabricated of insulating material. Screws 63 mechanically hold the individual inductor parts to one another through the separator ring 62. Additionally, these screws provide the requisite electrical connection between these parts.

The cylindrical portion of rotor 6 within which the plurality of conveyors 7 are sandwiched, is positioned in the intervening space between the inductor parts. A plurality of conductors 65 are located within the right end wall of rotor 6. These conductors provide individual connections to each of conveyors 7 at rotor contacts 12. The circular and separated disposition of the rotor contacts 12 is best shown in the exploded view of Figure 3.

A cup-shaped ionizer mount 70 fabricated of insulating material is sandwiched between stator contact support plate 72 and exciter housing sleeve 73. Components 70, 72 and 73 are all fabricated of insulating material and are fixedly positioned with respect to the housing.

Solenoid 20 is positioned within solenoid core 75 and the combination thereof is fixedly secured to stator contact support plate 72 by means of solenoid housing 76. A plurality of armature actuating rods 77 are slideably housed within a plurality of circularly disposed holes passing through solenoid housing 76. The right terminal ends of these rods support and carry armature 21 which is normally positioned away from solenoid 20 as is shown in the drawing. The left terminal ends of rods 77 slideably support and carry stator contact lever plate 14. Lever plate 14 is normally positioned in close engagement with plate 72 as is shown in the drawing by means of the tensioning exerted thereon to the right from a set of circularly disposed stator contacts 13. It will be noted that contacts 13 are normally spaced from the associated rotor contacts 12 whereby an electrical connection cannot be established therethrough. The outer ends of each of the stator contacts 13 is secured to the left face of stator contact support plate 72 by means of individual pins 79. As is best shown in Figure 3, alternate ones of these pins are electrically connected by means of conducting ring 22 which is preferably applied to the right surface of plate 72 by printing or painting techniques. As it will be recalled in connection with the description of the schematic circuit diagram of Figure 1, conductor 22 multiply connects alternate stator contacts 13.

The energization of solenoid 20 by the application of an operate potential to terminal 52 electromagnetically drives armature 21 to the left. This movement produces a corresponding action in actuating rods 77 which drives lever plate 14 to the left in opposition to the spring force which is applied thereto by stator contacts 13. This action causes stationary contacts 13 to come into operative contact with the rotating set of rotor contacts 12, whereby primer generaor 1 is effective to prime exciter generator 2.

Inductors 28 and 29 of exciter generator 2 are fixedly and diametrically supported by means of exciter housing sleeve 73. Ionizers 30 and 32 are fixedly supported by ionizer mount 70, and ionizers 31 and 33 are fixedly supported by means of bearing and ionizer mount 80. The component parts positioned within dielectric sleeve 45 are fixed with respect to their necessary positions by means of the spring force applied by spring 82 between bearing and ionizer mount 80 and end cap 43.

The operation of the foregoing generator structure in an ignition application is as follows. Ignition switch 16 shown in Figure 1 is closed thereby applying an operate potential to terminal 51 so as to energize motor 18. Motor 18 operatively drives rotor 6 of primer generator 1 and rotor 25 of exciter generator 2 at a synchronized speed. Output potentials do not appear at terminals 34 and 35 at this time inasmuch as contacts 13 are removed from contacts 12, whereby the necessary priming potential for exciter generator 2 is not applied from primer generator 1.

The momentary closure of starter switch 19 energizes solenoid 20, thereby causing contact lever plate 14 to drive contacts 13 to the left and into the rotating path of contacts 12. With this occurrence, a priming potential is applied to exciter generator 2.

Inasmuch as exciter generator 2 is self-exciting after a momentary application of the priming potential, switch 19 is opened after a short period of closure. This operation de-energizes solenoid 20, and spring contacts 13 drive lever plate 14 to the right, thereby removing the priming potential from exciter generator 2. This mode of operation is highly advantageous inasmuch as the output from the primer generator is supplied only during the period that it is actually required.

The output potentials appearing between terminals 34 and 35 are satisfactory to energize a main generator of the type suitable for ignition purposes and which incorporates a distributor so as to apply sparking potentials to the plugs of an associated engine.

It is to be understood that the above-described arrangements are illustrative of the application of the principles of this invention. Numerous other arrangements may be devised by those skilled in the art without departing from the scope of the invention.

Having thus described the invention, what is claimed as new and desired to be secured by Letters Patent is:

1. An electrostatic generator construction comprising a hollow, cylindrical housing; an electric motor positioned within the bore of said housing and at one end thereof; a drive shaft coupled to said motor and supported in axial alignment with the longitudinal axis of said housing and extending toward the other end of said housing; a conductive-conveyor primer generator including a hollow cylindrical rotor enveloping said motor and a rotor end wall coupled to said drive shaft, a plurality of circularly disposed conductive conveyors supported on said rotor, a plurality of circularly disposed inductors electrostatically coupled to said conveyors, and a plurality of circularly disposed contacts supported on said end wall and each individually connected to a different one of said conveyors; an insulating-conveyor generator including a hollow cylindrical rotor formed with a center supporting web coupled to said shaft, a cupped-shaped ionizer mount disposed within the bore section of said insulating rotor adjacent said rotor end wall, a plurality of ionizers supported on the outside surface of said mount and electrostatically coupled to the inside wall of said insulating rotor, a bearing and ionizer mount disposed within the bore section of said insulating rotor farthest removed fom said motor, a plurality of ionizers supported on the outside surface of said second mount and electrostatically coupled to the inside wall of said insulating rotor, a bearing carried by said second mount and supporting the terminal end of said shaft farthest removed from said motor, and a plurality of inductors coupled to the outside wall of said insulating rotor; a solenoid positioned over said shaft and within said first ionizer mount; a circular magnetic armature positioned over said shaft and between the closed end of said ionizer mount and the adjacent end of said solenoid; a contact support plate positioned over said shaft between said rotor end wall and the end of said solenoid adjacent thereto; a ring-like contact lever plate positioned over said shaft and between said rotor end wall and said contact support plate; a plurality of circularly disposed spring contacts carried by said support plate and each adapted normally to force said lever plate against said contact support plate; and a plurality of rods coupling said armature to said contact lever plate whereby the energization of said solenoid attracts said armature thereby forcibly driving the lever plate and its associated spring contacts into operative association with the contacts on said end wall.

2. An electrostatic generator construction comprising a hollow housing; an electric motor positioned within the bore of said housing and at one end thereof; a drive shaft coupled to said motor and supported in axial alignment with the longitudinal axis of said housing and extending toward the other end of said housing; a conductive-conveyor primer generator including a hollow cylindrical rotor supporting a plurality of conductive conveyors and enveloping said motor and having a rotor end wall coupled to said drive shaft, and a plurality of circularly disposed contacts supported on said end wall and each individually connected to a different one of said conveyors; an insulating conveyor generator including a hollow cylindrical rotor formed with a supporting web coupled to said shaft; a cupped-shaped ionizer mount disposed with a bore section of said insulating rotor adjacent said rotor end wall; a plurality of ionizers supported on the outside surface of said mount and electrostatically coupled to the inside wall of said insulating rotor; a solenoid positioned over said shaft and within said ionizer mount; a circular magnetic armature positioned over said shaft and between the closed end of said ionizer mount and the adjacent end of said solenoid; a contact support plate positioned over said shaft between said rotor end wall and the end of said solenoid adjacent thereto; a ring-like contact lever plate positioned over said shaft and between said rotor end wall and said contact support plate; a plurality of circularly disposed spring contacts carried by said support plate and each adapted normally to force said lever plate against said contact support plate; and a plurality of rods coupling said armature to said contact lever plate whereby the energization of said solenoid attracts said armature thereby forcibly driving the lever plate and its associated spring contacts into operative association with the contacts on said end wall.

3. An electrostatic generator construction comprising an electric motor; a drive shaft coupled to said motor; a conductive-conveyor primer generator including a hollow cylindrical rotor supporting a plurality of conductive conveyors enveloping said motor and having a rotor end wall coupled to said drive shaft, and a plurality of circularly disposed contacts supported on said end wall and each individually connected to a different one of said conveyors; an insulating-conveyor generator including a hollow cylindrical rotor formed with a supporting web coupled to said shaft; a solenoid positioned over said shaft and within the bore of said second rotor; a magnetic armature positioned over said shaft and between the supporting web and the adjacent end of said solenoid; a contact support plate positioned over said shaft between said rotor end wall and the end of said solenoid adjacent thereto; a contact lever plate positioned over said shaft and between said rotor end wall and said contact support plate; a plurality of circularly disposed spring contacts carried by said support plate and each adapted normally to force said lever plate against said contact support plate; a plurality of rods coupling said armature to said contact lever plate whereby the energization of said solenoid attracts said armature thereby forcibly driving the lever plate and its associated spring contacts into operative association with the contacts on said end wall; and a housing enclosing all of the foregoing components.

4. An electrostatic generator construction comprising an electric motor; a drive shaft coupled to said motor; a conductive-conveyor generator including a hollow cylindrical rotor supporting a plurality of conductive conveyors enveloping said motor and having a rotor wall coupled to said drive shaft, and a plurality of contacts supported by said wall and each individually connected to a different one of said conveyors; an insulating-conveyor generator including a hollow cylindrical rotor formed with a supporting web coupled to said shaft; a solenoid positioned over said shaft and within the bore of said second rotor; a magnetic armature positioned over said shaft; a stator contact support positioned over said shaft between said rotor wall and the end of said solenoid adjacent thereto; a contact lever positioned over said shaft and between said rotor wall and said contact support; a plurality of spring contacts carried by said contact support and adapted normally to force said lever toward said contact support; and means coupling said armature to said contact lever whereby the energization of said solenoid attracts said armature thereby forcibly driving the lever and its associated spring contacts into operative association with the contacts on said wall.

5. An electrostatic generator construction comprising a motor; a drive shaft coupled to said motor; a conductive-conveyor primer generator including a hollow cylindrical rotor formed with a rotor wall coupled to said drive shaft, a plurality of circularly disposed conductive conveyors supported by said rotor, and a plurality of circularly disposed contacts supported on said wall and each individually connected to a different one of said conveyors; an insulating-conveyor generator including a hollow cylindrical rotor formed with a supporting web coupled to said shaft; a solenoid positioned over said shaft and within the bore of said second rotor; a magnetic armature positioned over said shaft; a stator contact support plate positioned over said shaft between said rotor wall and the end of said solenoid adjacent thereto; a contact lever plate positioned over said shaft and between said rotor wall and said support plate; a plurality of spring contacts carried by said support plate and each adapted normally to force said lever toward said support plate; and means coupling said armature to said lever plate whereby the energization of said solenoid attracts said armature thereby forcibly driving the lever plate and its associated spring contacts into operative association with the contacts supported by said end wall.

6. An electrostatic generator construction comprising a motor; a shaft coupled to said motor; a conductive-conveyor primer generator including a rotor formed with a wall coupled to said drive shaft, a plurality of circularly disposed conductive conveyors supported by said rotor, and a plurality of contacts supported by said wall and each individually connected to a different one of said conveyors; an insulating-conveyor generator including a hollow cylindrical rotor formed with a supporting web coupled to said shaft; a solenoid positioned adjacent said shaft and within the bore of said second rotor; an armature magnetically coupled to said solenoid; a stator contact support positioned between said rotor wall and the end of said solenoid adjacent thereto; a contact lever positioned adjacent said contact support; a plurality of spring contacts carried by said support and each adapted normally to force said lever toward said contact support; and means coupling said armature to said contact lever whereby the energization of said solenoid attracts said armature thereby forcibly driving the lever and its associated spring contacts into operative association with the contacts supported by said end wall.

7. An electrostatic generator construction comprising a motor; a drive shaft coupled to said motor; a conductive-conveyor primer generator including a rotor coupled to said drive shaft, a plurality of circularly disposed conductive conveyors supported by said rotor, and a plurality of contacts connected to said conveyors and movable therewith; an insulating-conveyor generator including a hollow cylindrical rotor formed with a supporting web coupled to said shaft, said second rotor being positioned in an axially displaced relation with respect to the first rotor; a solenoid positioned adjacent said shaft and within the bore of said second rotor; an armature magnetically coupled to said solenoid; a contact lever; a plurality of spring contacts each adapted normally to force said lever to a first position; and means coupling said armature to said contact lever whereby the energization of said solenoid moves said armature thereby forcibly driving the lever and its associated spring contacts into operative association with the contacts connected to said conveyor.

8. An electrostatic generator construction comprising a conductive-conveyor primer generator including a plurality of circularly disposed conductive conveyors, and a plurality of contacts connected to said conveyors and movable therewith; a second electrostatic generator including a hollow cylindrical rotor, said rotor being longitudinally displaced from said primer generator; a solenoid positioned within the bore of said second rotor; an armature magnetically coupled to said solenoid; a contact lever; a plurality of contacts normally positioned away from the contacts connected to the conveyors and engaging said lever; and means coupling said armature to said lever whereby the energization of said solenoid moves said armature thereby forcibly driving the lever and its engaged contacts into operative association with the contacts connected to said conveyor.

9. An electrostatic generator construction comprising an electric motor; a drive shaft coupled to said motor; a conductive-conveyor primer generator including a hollow cylindrical rotor containing said motor and having a rotor end wall coupled to said drive shaft, a plurality of circularly disposed conductive conveyors supported on said rotor and enveloping said motor, a plurality of circularly disposed inductors electrostatically coupled to said conveyors and enveloping said motor, and a plurality of circularly disposed contacts supported on said end wall and each individually connected to a different one of said conveyors; and means for interconnecting said conveyors and inductors through said contacts whereby an output potential is generated.

10. An electrostatic generator construction comprising an electric motor; a drive shaft coupled to said motor; a conductive-conveyor primer generator including a hollow cylindrical rotor containing said motor and having a rotor end wall coupled to said drive shaft, a plurality of circularly disposed conductive conveyors supported on said rotor and enveloping said motor, a plurality of circularly disposed inductors electrostatically coupled to said conveyors and enveloping said motor, and a plurality of circularly disposed contacts supported on said end wall and each individually connected to a different one of said conveyors; means for interconnecting said conveyors and inductors through said contacts whereby an output potential is generated; and a housing enclosing all of the foregoing components.

11. An electrostatic generator construction comprising a motor; a drive shaft coupled to said motor; a conductive-conveyor primer generator including a rotor and having a rotor wall coupled to said drive shaft, a plurality of conductive conveyors supported on said rotor and enveloping said motor, a plurality of inductors electrostatically coupled to said conveyors and enveloping said motor, and a plurality of contacts supported on said rotor and connected to said conveyors; and means for interconnecting said conveyors and inductors through said contacts whereby an output potential is generated.

12. An electrostatic generator construction comprising a motor; a hollow cylindrical motor mount fabricated of insulating material enveloping and supporting said motor; a drive shaft coupled to said motor; a conductive-conveyor primer generator including a plurality of circularly disposed conductive conveyors supported on said rotor and enveloping said motor and said motor mount, a plurality of circularly disposed conductive conveyors supported on said rotor and enveloping said motor and said motor mount, a plurality of circularly disposed inductors electrostatically coupled to said conveyors and enveloping said motor and said motor mount, and means for interconnecting said conveyors and inductors whereby an output potential is generated; and a housing enclosing all of the foregoing components.

13. An electrostatic generator construction comprising a motor; a hollow cylindrical motor mount fabricated of insulating material enveloping and supporting said motor; a drive shaft coupled to said motor; a conductive conveyor primer generator including a plurality of circularly disposed conductive conveyors enveloping said motor and said motor mount, and a plurality of circularly disposed inductors electrostatically coupled to said conveyors and enveloping said motor and said motor mount; and means for interconnecting said conveyors and inductors whereby an output potential is generated.

14. An electrostatic generator construction comprising an electric motor, a hollow cylindrical motor mount fabricated of insulating material enveloping and supporting said motor, a drive shaft coupled to said motor, an electrostatic generator having a hollow cylindrical rotor including means for transporting electrical charges and coupled to said drive shaft, said motor being positioned within the bore of said rotor, and a housing enclosing all of the foregoing components.

References Cited in the file of this patent

UNITED STATES PATENTS

| 422,148 | Parkhurst | Feb. 25, 1890 |
| 1,313,537 | Jones | Aug. 19, 1919 |
| 1,825,119 | Mug | Sept. 29, 1931 |

FOREIGN PATENTS

| 918,547 | France | Oct. 28, 1946 |
| 947,921 | France | Jan. 17, 1949 |